United States Patent [19]

Carlsson

[11] 3,940,171

[45] Feb. 24, 1976

[54] LIFTING DEVICE, PARTICULARLY FOR LIFTING AND TRANSPORTING BUILDING BOARDS, SUCH AS PLASTER AND WOOD PARTICLE BOARDS

[76] Inventor: Bertil Sigvard Carlsson, Elvegarden, Bankeryd, Sweden

[22] Filed: Apr. 26, 1973

[21] Appl. No.: 354,758

[30] Foreign Application Priority Data

Apr. 27, 1972 Germany ...................... 7216138

[52] U.S. Cl. ................. 294/15; 224/45 P; 254/131; 294/19 R

[51] Int. Cl.$^2$ ....................... B66F 15/00; B65G 7/12

[58] Field of Search .............. 294/1 R, 15, 17, 19 R, 294/67 R, 67 A, 67 AA, 67 AB, 67 B; 224/45 P; 254/25, 26 E, 39, 44, 121, 131; 269/133; 292/288, 343

[56] References Cited

UNITED STATES PATENTS

| | | | |
|---|---|---|---|
| 1,525,146 | 2/1925 | Owen | 294/67 AB |
| 2,150,503 | 3/1939 | Hawkins | 294/17 X |
| 2,428,941 | 10/1947 | Packard | 294/15 X |
| 2,457,231 | 12/1948 | Henderson | 254/25 |
| 2,655,399 | 10/1953 | McMillan | 294/17 |
| 3,203,606 | 8/1965 | Masterson | 224/45 P |
| 3,642,251 | 2/1972 | Niederholtmeyer | 294/15 X |
| 3,749,437 | 7/1973 | Lynn | 294/67 AA |

FOREIGN PATENTS OR APPLICATIONS

| | | | |
|---|---|---|---|
| 389,095 | 2/1924 | Germany | 254/131 |
| 219,466 | 7/1924 | United Kingdom | 254/26 E |

*Primary Examiner*—Evon C. Blunk
*Assistant Examiner*—Johnny D. Cherry
*Attorney, Agent, or Firm*—Robert E. Burns; Emmanuel J. Lobato; Bruce L. Adams

[57] ABSTRACT

A device for lifting and transporting building boards comprises a tubular column extending upwardly from a bottom plate and provided at its upper end with a rearwardly projecting handle. The bottom plate has a forward edge portion providing a bearing surface for the building board and an upwardly curved rearward portion. A vertical supporting plate extends upwardly from the bottom plate in front of the upwardly extending column and is preferably braced to a rearward portion of the bottom plate. A horizontal distance member mounted on the column comprises a pressure plate mounted at the end of the stem portion of a tubular tee having a sleeve portion surrounding the column so as to be rotatable and longitudinally movable thereon.

7 Claims, 1 Drawing Figure

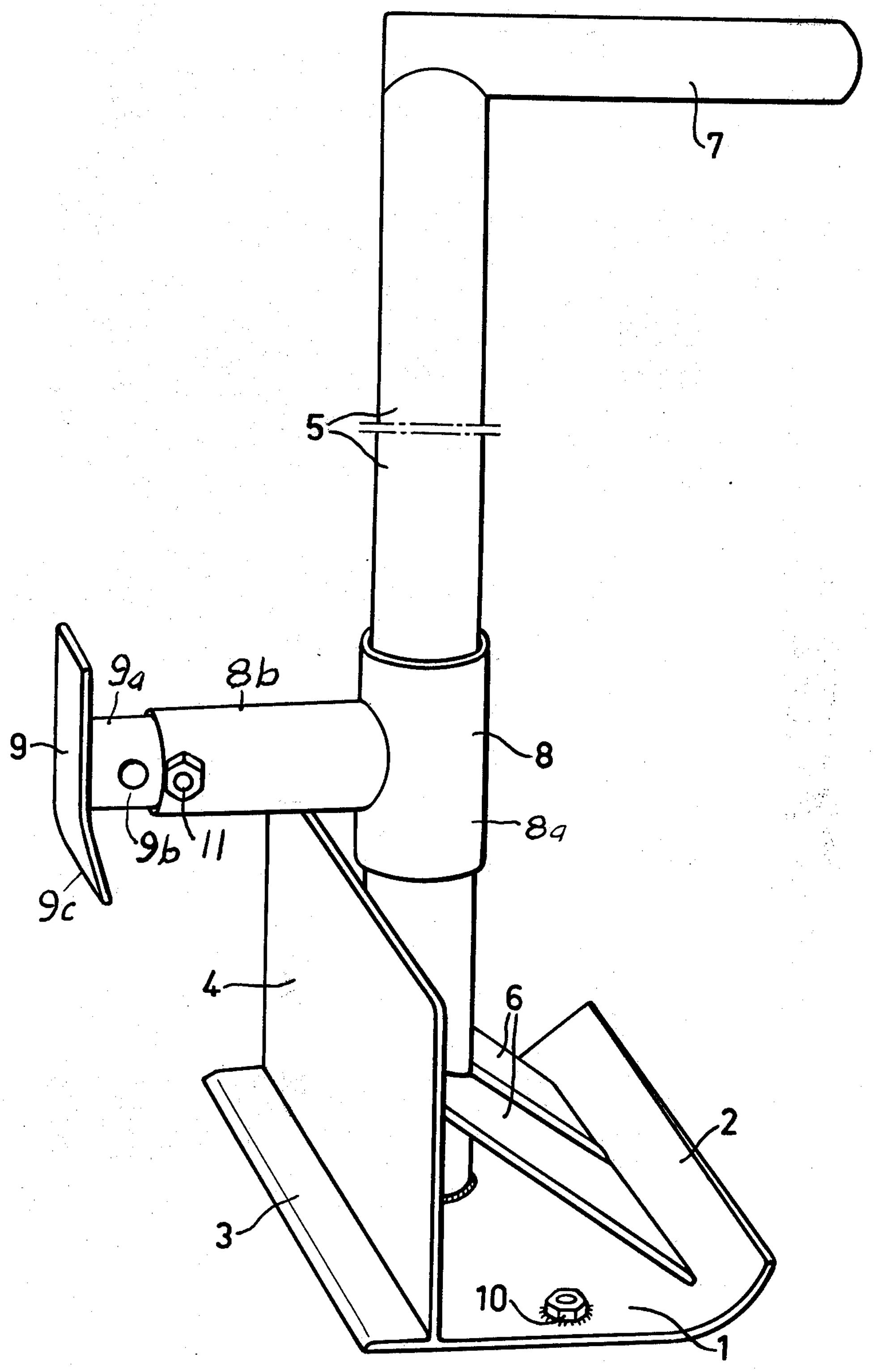
7
5
9a
8b
9
8
9b
11
8a
9c
4
6
2
3
10
1

LIFTING DEVICE, PARTICULARLY FOR LIFTING AND TRANSPORTING BUILDING BOARDS, SUCH AS PLASTER AND WOOD PARTICLE BOARDS

FIELD OF INVENTION

The present invention relates to a lifting device particularly for lifting, transporting and positioning building boards such as plaster boards and wood particle boards.

BACKGROUND OF THE INVENTION

In the handling and installation of building boards, such as plaster boards and wood particle boards, it is necessary to transport the boards from a storage area to the building site and to position them accurately while they are secured in place. Heretofore, no special handling devices have been available which satisfy the special requirements of handling and installing building boards. Such requirements include accurate positioning and leveling, good contact with a vertical surface of the board to hold it in place and easy transportability. Various conventional devices, mostly intended for a wide range of applications, do not satisfy these said requirements.

SUMMARY OF THE INVENTION

It is an object of the present invention to eliminate the above-mentioned deficiencies and to provide a special lifting device which meets the various requirements of this specialized field. In accordance with the invention, there is provided a lifting device which provides for conveniently transporting the building boards from a storage area to the point of use, and for accurately positioning them and holding them in place while they are being installed.

In accordance with the invention a handle extends upwardly from a bearing support providing a bearing surface for the building board and is provided at its upper end with hand grip means. A horizontal distance member is movably mounted on the handle and is engageable with a vertical face of the building boards. The handle is arranged so as to coact with the bearing surface in a force-locking manner so as to hold and position the board. The horizontal distance member is movable vertically on the handle and is also rotatable about the handle. The bearing support preferably comprises a horizontal bottom plate having a forward edge portion engageable under a building board and an upwardly extending vertical supporting plate engageable with a face of the building board.

DESCRIPTION OF DRAWING

The objects, nature and advantages of the invention will be more fully understood from the following description of a preferred embodiment, shown by way of example in the accompanying drawing in which the single FIGURE is a perspective view of a lifting device in accordance with the invention.

DESCRIPTION OF PREFERRED EMBODIMENT

The lifting device shown by way of example of the drawing comprises a bottom plate 1, which is generally of rectangular shape and is generally flat except for an upwardly curved rearward portion 2. A forward portion 3 provides a lifting area for engagement with an edge of the building board that is to be transported or positioned. At the rearward extent of this relatively narrow lifting area a supporting plate 4 extends vertically upwardly from the bottom plate. The supporting plate 4 is disposed parallel to the forward edge of the bottom plate and is perpendicular to the bottom plate. Stays 6 sloping down from an upper portion of the supporting plate 4 to a rearward portion of the bottom plate 1, are secured to the supporting plate and the bottom plate, for example by welding, and assist in rigidifying and strengthening the structure.

A tubular column 5 extends vertically upwardly from the bottom plate 1 and is secured thereto, for example by welding. The column 5 is disposed just behind the supporting plate 4 and may be welded or otherwise secured to the supporting plate to provide a stronger construction. At its upper end the column 5 is provided with a rearwardly extending handle portion 7. A horizontal distance member mounted on the column 5 is shown as comprising a tubular tee 8 having a sleeve portion **8*a* having a bore therethrough and surrounding the column 5, so as to be rotatable and axially slidable thereon and a stem portion 8*b* projecting perpendicularly from the sleeve portion. A pressure plate 9 is adjustably mounted on the stem portion of the tee 8 by means of a shank portion 9*a*, which extends slidably in the stem portion 8*b* of the tee. Suitable means is provided for securing the pressure plate in adjusted position. Such means is shown by way of example as comprising a screw or bolt 11, which extends through a hole in the stem portion 8*b*, and is engageable selectively with spaced holes 9*b* in the shank portion of the pressure plate 9, only one such hole being visible in the drawing. The pressure plate 9 comprises a generally vertical plate which is flat except for a slightly rearwardly bent lower portion 9*c*. The mounting of the horizontal distance member provides for rotation and for axial movement on the column 5**.

The bottom plate 1 is shown provided with threaded holes or other holding means 10 for the convenient attachment of distance pieces below the bottom plate. These distance pieces may be spacers (not shown) having threaded end portions for engaging the holding means 10 and extending downwardly from the bottom plate. By using spacers of different height, the height of the bottom plate above an underlying supporting surface is thereby rendered conveniently adjustable.

In using a lifting device in accordance with the invention for transporting a building board, the pressure plate 9 is swung around to the rear of the column 5 by rotation of the tubular tee 8 on the column 5 and the lifting area 3 of the bottom plate 1 is placed under the building board. The building board can thereupon be conveniently lifted and carried. Moreover, with the bottom plate 1 resting on a flat surface, the lifting device acts as a stand to support a building board in vertical position. After arrival at the place of installation, for example a vertical building surface to be provided with the board, the tubular tee 8 is raised to the desired height and is rotated about the column 5 to bring the pressure plate 9 to bear against the board. Owing to the weight of the board, the pressure plate presses the building board onto the surface where it is to be installed and it keeps it there without the need of applying other force. The curved rearward portion 2 of the bottom plate 1 acts as a fulcrum about which the bottom plate 1 may be pivoted. This may be achieved by pulling in a rearward direction on the column 5 or the handle 7. Upon lifting of the forward portion 3 of the bottom plate by tipping the device about the curved rearward portion as a pivot, it is only necessary to move the supporting plate 9 downwardly whereupon the device locks itself and the building board in the lifted position without application of external forces.

While a preferred embodiment of the invention has been illustrated in the drawings and is herein particularly described, it will be understood by those skilled in the art that various modifications can be made and that the invention is no way limited to the illustrated embodiment.

What I claim and desire to secure by Letters Patent is:

1. A lifting device for lifting and transporting a building board such as a plaster or wood particle board or the like, comprising:

a bearing support comprising a bottom plate having a forward portion for supporting said board in use and a rearwardly extending curved portion curved upwardly for pivoting said bottom plate thereabout to lift said board while supported in use on said forward portion;

a column connected to said bearing support and extending upwardly therefrom for effecting pivoting of said bottom plate about said curved portion by rearwardly displacing of said column from an upstanding position in a direction toward said curved portion;

a pressure plate freely mounted for rotation about said column and freely slidable axially along said column and positionable in use at a rearward position to clear said board while supported in use on said forward portion and rotatable to a forward position for bearing against a major surface of said board in use on said forward portion while said board is positioned against a generally vertical work surface on which said board is to be disposed; and a tubular tee comprising a sleeve portion, and a stem fixed to said pressure plate and projecting from said sleeve portion, said sleeve portion having an axial bore extending therethrough mounted with said column extending through said axial bore for free rotation about said column and freely slidable axially along said column, said pressure plate and said tubular tee being gravity biased to slide downwardly along said column to maintain said pressure plate bearing against said board in use while said board is supported on said forward portion and while said board is positioned against said generally vertical work surface, and to bear on said board and progressively slide downwardly along said column as said column is progressively rearwardly displaced to effect pivoting of said bottom plate and lifting of said board while maintaining said pressure plate bearing against said board and thereby to maintain said board positioned against said generally vertical work surface during the lifting of said board, whereby said board is maintained in a lifted position while supported on said forward portion and positioned against said work surface and bearing downwardly on said forward portion upon release of said column.

2. A lifting device according to claim 1, in which said bearing support further comprises a supporting plate that extends upwardly from said bottom plate at a selected distance from the forward edge of said bottom plate.

3. A lifting device according to claim 2, further comprising bracing means connecting said supporting plate with the rearward portion of said bottom plate.

4. A lifting device according to claim 2, in which said column extends upwardly from said bottom plate immediately rearwardly of said supporting plate and further includes at its upper end a rearwardly extending handle portion.

5. A lifting device according to claim 1, in which said pressure plate has a lower portion that is curved rearwardly toward said column.

6. A lifting device according to claim 1, in which said pressure plate has a shank portion received in the stem portion of said tee, and means for securing said shank portion in an adjusted position.

7. A lifting device according to claim 1, in which said bearing support is provided with holding means for attaching to spacers extending below said bearing support.

* * * * *